United States Patent
LeBert et al.

(10) Patent No.: US 8,749,589 B2
(45) Date of Patent: Jun. 10, 2014

(54) INFORMATION HANDLING SYSTEM WITH TOUCH PAD AND POINT STICK

(75) Inventors: Ronald LeBert, Austin, TX (US); Robert C. Nerhood, II, Round Rock, TX (US); Kevin Mundt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 841 days.

(21) Appl. No.: 12/416,123

(22) Filed: Mar. 31, 2009

(65) Prior Publication Data

US 2010/0245395 A1    Sep. 30, 2010

(51) Int. Cl.
*G09G 5/00* (2006.01)
*G06F 3/01* (2006.01)
*G06F 3/038* (2013.01)
*G06F 3/0485* (2013.01)

(52) U.S. Cl.
CPC ............. *G06F 3/016* (2013.01); *G06F 3/011* (2013.01); *G06F 3/038* (2013.01); *G06F 3/0485* (2013.01)
USPC ........... 345/684; 345/156; 345/157; 345/158; 345/159; 345/160; 345/161; 345/162; 345/163; 345/164; 345/165; 345/166; 345/167; 345/168; 345/169; 345/170; 345/172; 345/173

(58) Field of Classification Search
CPC .......... G06T 3/016; G06T 3/011; G06T 3/038
USPC ................................................ 345/156–173
See application file for complete search history.

(56) References Cited

U.S. PATENT DOCUMENTS

| | | | |
|---|---|---|---|
| 6,188,390 B1 * | 2/2001 | Selker et al. ................. 345/168 |
| 6,259,432 B1 | 7/2001 | Yamada et al. |
| 6,614,421 B1 * | 9/2003 | Selker et al. ................. 345/168 |
| 6,677,927 B1 * | 1/2004 | Bruck et al. ................. 345/156 |
| 6,950,092 B2 | 9/2005 | Buss |
| 6,999,065 B1 | 2/2006 | Tognazzini |
| 7,057,603 B2 | 6/2006 | Hill et al. |
| 7,075,513 B2 | 7/2006 | Silfverberg et al. |
| 7,173,637 B1 | 2/2007 | Hinckley et al. |
| 2002/0118164 A1 * | 8/2002 | Buss ............................. 345/156 |
| 2002/0164187 A1 * | 11/2002 | Huang ........................ 400/472 |
| 2004/0104895 A1 * | 6/2004 | Rekimoto .................... 345/168 |
| 2004/0164955 A1 * | 8/2004 | Miyashita et al. ........... 345/156 |
| 2006/0071915 A1 * | 4/2006 | Rehm ......................... 345/173 |
| 2006/0114225 A1 * | 6/2006 | Tsukada et al. .............. 345/157 |
| 2007/0205993 A1 * | 9/2007 | Gloyd et al. ................. 345/169 |
| 2007/0229472 A1 * | 10/2007 | Bytheway .................... 345/173 |
| 2008/0174951 A1 * | 7/2008 | Mundt et al. ................. 361/686 |
| 2008/0270949 A1 * | 10/2008 | Liang ........................... 715/859 |
| 2010/0026626 A1 * | 2/2010 | Macfarlane .................. 345/160 |
| 2010/0046187 A1 * | 2/2010 | Murakami ................... 361/803 |

* cited by examiner

*Primary Examiner* — Jin-Cheng Wang
(74) *Attorney, Agent, or Firm* — Baker Botts L.L.P.

(57) ABSTRACT

An information handling system is disclosed including a display, a base coupled to the display and a keypad with a plurality of keys disposed on the base. The system further includes a touchpad located proximate the keypad and a point stick located substantially between at least two of the plurality of keys, wherein the point stick is configured to be a scroll control device. A method for manipulating information on a display of an information handling system is further disclosed herein. The method includes moving a cursor on the display using a touchpad proximate a keypad on the information handling system and scrolling the information on the display in a direction corresponding with the direction of pressure applied to a top portion of a point stick located substantially between at least two keys of the keypad.

16 Claims, 4 Drawing Sheets

INFORMATION HANDLING SYSTEM WITH TOUCH PAD AND POINT STICK

TECHNICAL FIELD

The present disclosure relates generally to the field of information handling systems and, more specifically, to input devices for manipulating data in the information handling system. Still more specifically, the disclosure relates to a touch pad configured as a cursor control device and a point stick configured as a scroll control device.

BACKGROUND

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, touch pads are used to move a cursor on a display of an information handling system (IHS). The touch pad may be located proximate a keypad and may have one or more buttons located proximate the touch pad. The user may use the touch pad as an alternative to a mouse to move the cursor on the display. For example, the user may place a finger on the touch pad and move their finger in the direction they would like the cursor to move on the display. As the user's finger moves on the touch pad, the cursor moves on the display. The user may move the cursor in any direction using the touch pad. The user may use the buttons in a similar manner as the right click and select button on a typical mouse. Therefore, by using the touch pad and the touch pad buttons the user may manipulate the information handling system in a similar manner as the mouse manipulates the data in the information handling system. Typically, the touch pad does not allow a user to scroll the information (e.g., pages) displayed on the display in an upward or downward direction, because it is configured to move only the cursor.

Typically, portable IHSs may come equipped with both a touch pad and an additional input device, a point stick, to manipulate a cursor or data content on the portable IHS display. In most cases, a customer may prefer the use of a touch pad, thereby leaving limited use for the point stick. Thus, a need exists for apparatus, systems and methods for reconfiguring the functionality of input devices, such as a point stick, to manipulate a cursor or data content on the portable IHS display.

SUMMARY

The following presents a general summary of several aspects of the disclosure in order to provide a basic understanding of the disclosure. This summary is merely a general overview of the disclosure and is not intended to identify key or critical elements of the disclosure or to delineate the scope of the claims. The following summary presents some concepts of the disclosure in a general form as a prelude to the more detailed description that follows.

One aspect of the disclosure is an information handling system including a display, a base coupled to the display and a keypad with a plurality of keys disposed on the base. The system further includes a touchpad located proximate the keypad and a point stick located substantially between at least two of the plurality of keys, wherein the point stick is configured to be a scroll control device.

Another aspect of the disclosure is a method for manipulating information on a display of an information handling system. The method includes moving a cursor on the display using a touchpad proximate a keypad on the information handling system and scrolling the information on the display in a direction corresponding with the direction of pressure applied to a top portion of a point stick located substantially between at least two keys of the keypad.

Yet another aspect of the disclosure is a keypad for use with an information handling system. The keypad includes a plurality of keys and a touchpad located proximate the plurality of keys, wherein the touchpad is configured as a cursor control device. The keypad further includes a point stick configured as a scroll control device, wherein the point stick is located substantially between at least two of the plurality of keys.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Figure 1:
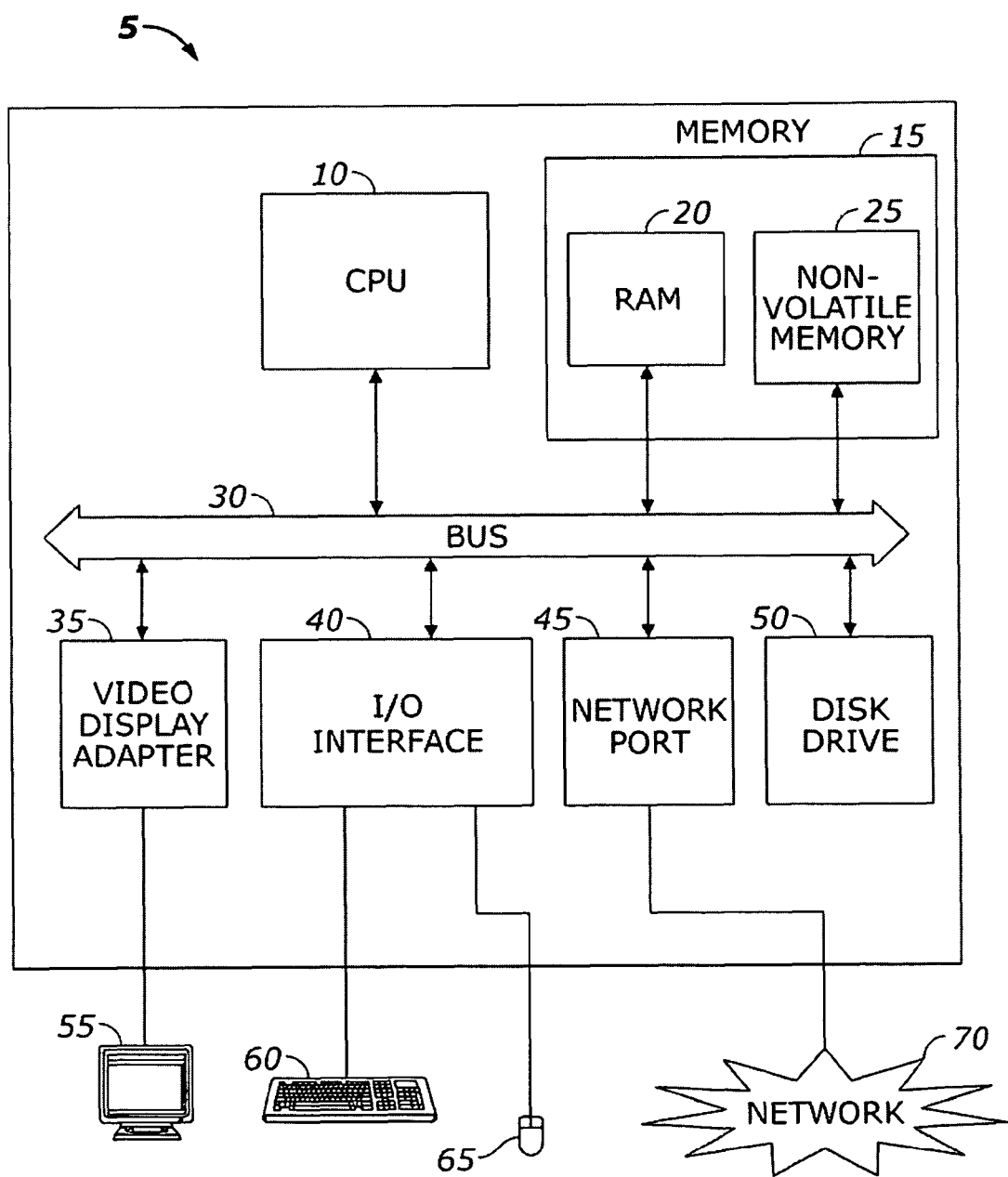
FIG. 1 is a generalized illustration of an information handling system in accordance with one aspect of the present disclosure.

Before the present apparatus, systems and methods are described, it is to be understood that this disclosure is not limited to the particular apparatus, systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

This disclosure is not limited in its application to the details of construction and the arrangement of components set forth in the following description or illustrated in the drawings. The disclosure is capable of other embodiments, implementations or aspects and of being practiced or of being carried out in various ways. Also, the use of "including," "comprising," "having," "containing," "involving," "consisting" and variations thereof, is meant to encompass the items listed thereafter and equivalents thereof as well as additional items.

It must also be noted that as used herein and in the appended claims, the singular forms "a," "and," and "the" may include plural referents unless the context clearly dictates otherwise. Thus, for example, reference to "a key" may refer to one or several keys, and reference to "a method for coupling" includes reference to equivalent steps and methods known to those skilled in the art, and so forth.

For purposes of this disclosure, an implementation of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a display. The IHS may also include one or more buses operable to transmit data communications between the various hardware components.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, display 55 (e.g., video display) and/or other input/output devices not shown here. This type of firmware may be known as a basic input/output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2A:
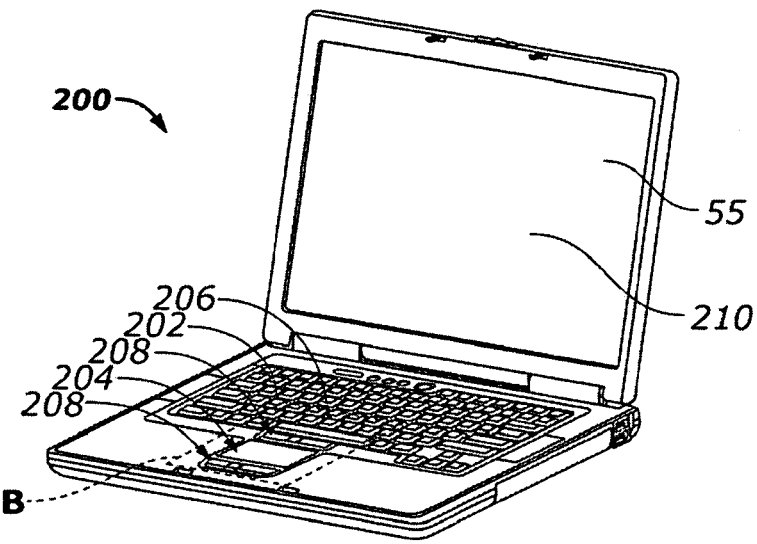
FIG. 2A is a perspective view of a portable information handling system in accordance with one aspect of the present disclosure.

FIG. 2A depicts a portable information handling system (IHS), also commonly referred to as a notebook computer or laptop 200. The laptop 200 may include the display 55 coupled to a base which may include a plurality of input devices for inputting data into the information handling system. The input devices may include a keypad 202, a touchpad 204, a point stick 206, and one or more buttons 208 proximate the touchpad 204 and/or the keypad 202. The input devices allow a user to input and/or manipulate data in the IHS 5. For example, the user may use the keypad 202 (i.e., actuate the keys) to input characters such as letters, or numbers into the IHS 5. As such, a plurality of keys on the keypad may represent various alphanumeric characters, examples of which include the letters g and h and numbers 1, 2, and 3. As used herein, actuating a key or button may including selecting, pressing, applying pressure or the like.

The touchpad 204 may be configured to control a cursor 210 on the display 55. The point stick 206 may be configured to scroll data on the display 55. Thus, the user may use the touchpad 204 to manipulate the cursor 210 in a similar manner to a mouse, while using the point stick 206 to scroll the data on the display. The point stick 206 may be repurposed to control the cursor 210.

As, shown, the touchpad 204 may be located proximate the keypad 202, particularly the space bar. The touchpad 204 may be configured to have cursor control function as a cursor control device. The cursor control function allows the user to manipulate the cursor 210 on the display 55. Thus, the touchpad 204 may allow the user to manipulate the location of the cursor on the display 55. The user may touch the touch pad 204 with a finger, then move the finger in any suitable direction. As the user moves his/her finger along the surface of the touchpad 204 the cursor may move on the display 55 in a direction similar to the movement of the finger on the touchpad 204. Thus, the touchpad 204 may be used in a similar manner to moving a typical mouse 65 coupled to an IHS.

The point stick 206 may be configured to have scroll control function as a scroll control device. The scroll control function allows a user to scroll data (e.g., content of an application, page within an application) displayed on the display 55 in the direction of a pressure applied to the point stick 206. The point stick 206 may allow the user to scroll the data in a vertical direction, a horizontal direction, and/or any combination thereof, such as in a diagonal direction. To that end, the point stick 206 may be configured as a two-axis scroll wheel, enabling scrolling of data content along a first axis (e.g., x-axis, horizontal axis) or along a second axis (e.g., y-axis, vertical axis). For example, if the user wants to scroll the data displayed on the display 55 down, the user would place a finger on the top portion of the point stick 206. The user would then apply pressure on the point stick 206 to move the point stick in a direction corresponding to the direction he/she wants the data to scroll. Thus, to scroll the data down, the user would move the point stick toward the space bar on the keyboard 202. The user may scroll the data on the display 55 in any suitable direction by applying pressure on the point stick 206 in the desired direction. The point stick 206 may also be reconfigured as a cursor control device, and/or a zoom device as will be described in more detail below.

Figure 2B:
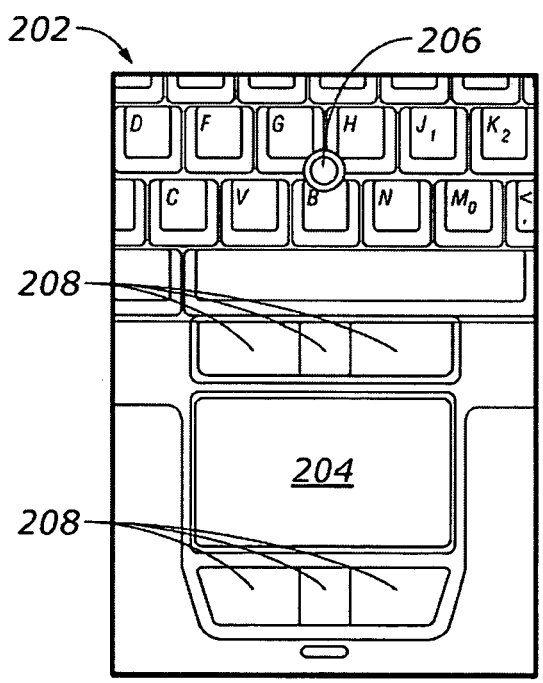
FIG. 2B is a magnified view of a portion of a keypad of an information handling system in accordance with one aspect of the present disclosure.

FIG. 2B shows a magnified view of a portion of the keypad 202 in accordance with one aspect of the present disclosure. Typically, the point stick is located substantially between at least two keys on the keypad 202. The point stick 206 is shown in FIG. 2B located between the G, H and B keys on the keypad 202. It should be appreciated, however, that the point stick 206 may be located at any suitable location on the keypad 202 or between at least any two keys of the keypad 202.

There may be one or more point stick buttons 208 shown located between the spacebar and the touchpad. The point stick buttons 208 may be used to control the functionality of the point stick. Although three point stick buttons 208 are shown, it should be appreciated that there may be any suitable number of point stick buttons 208. It should be appreciated that the point stick buttons may be located at any suitable location on the laptop 200.

Generally, a point stick button 208 may configure a scroll parameter of the point stick. A scroll parameter may encompass any conventional property of the point stick's ability to scroll data across a display of an IHS. In one implementation, a first point stick button 208 may be configured to control the scroll speed, as one example of a scroll parameter. Thus, the user may actuate the first point stick button 208 to quickly manipulate the scroll speed from a slower to a faster setting and visa versa. A second point stick button 208 may be configured to toggle the point stick 206 between several scroll modes, as another example of a scroll parameter. For example, the user may actuate the second point stick button 208 to change the point stick from a first scroll mode of a scroll control device to a second scroll mode of a the cursor control device and optionally to a third scroll mode of a zoom control device. As such, the zoom control device may enable a user to see a zoom-in (i.e., magnify) or zoom-out view of the data content(s) on the display of the IHS.

A third point stick button 208 may be configured to toggle the scroll control device between varying scroll modes. For example, the user may toggle between the scroll control device moving at one speed as pressure is applied, or moving at an increasing speed as a function of the pressure, and/or amount of time the pressure is applied. Various other scroll methods and/or modes may be contemplated depending on the particular product (e.g., touchpad, mouse) or user's preference. For example, the graphical user interface (GUI) may provide scroll bars which may be activated via a scroll control device or a cursor control device. Further, particular areas on the touchpad (e.g., center, edge) may be dedicated to scrolling. Some touchpads may implement scrolling methods/modes through a user's gestural motions (e.g., tapping). Further, some point sticks may implement scrolling methods/modes via press and hold key combinations, as may be determined by a user.

As previously mentioned, there may be one or more touchpad buttons 209. As shown, the one or more touchpad buttons 209 are located under the touchpad 202, however, it should be appreciated that the touchpad buttons 209 may be located at any suitable location on the laptop 200. The touchpad buttons 209 may be configured to perform any function described herein. For example, the touchpad buttons 209 may be configured in a similar manner to traditional mouse buttons. In this instance, the right touchpad button 209 may be similar to the right click button on a mouse, and the left touchpad button 209 may be similar to the mouse select button.

Figure 3:
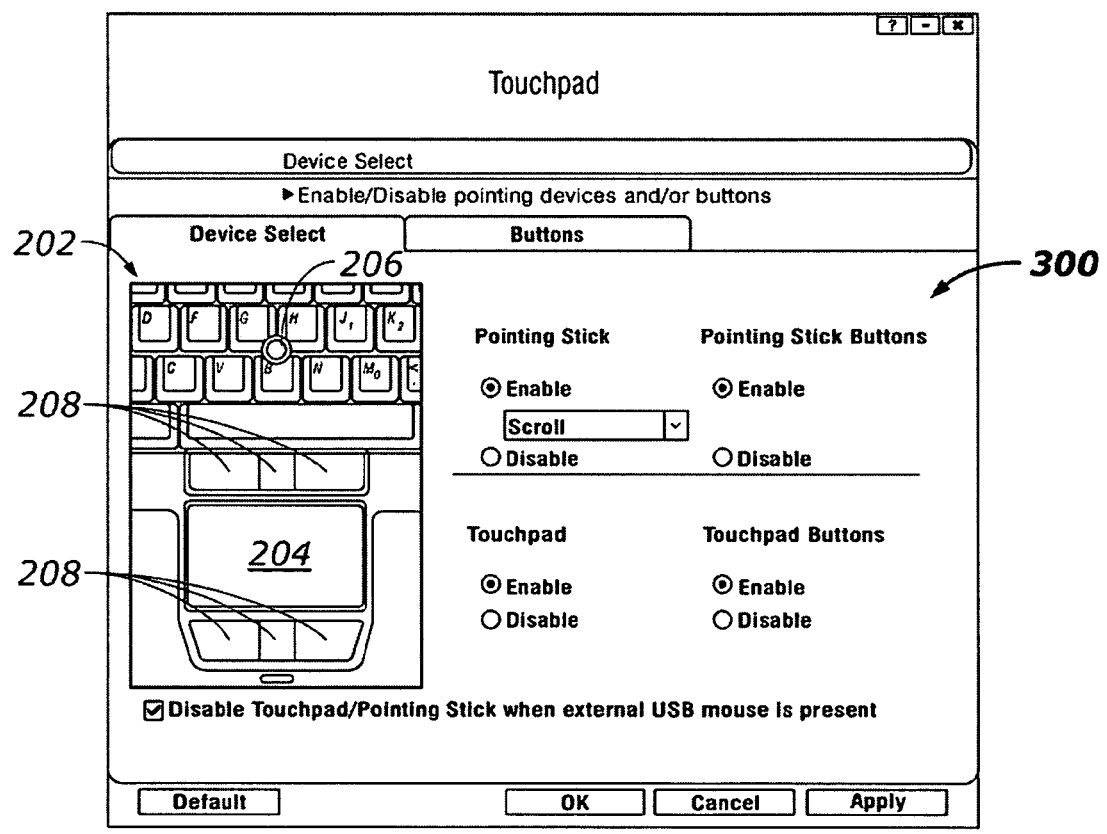
FIG. 3 is a view of a graphic user interface (GUI) in accordance with one aspect of the present disclosure.

FIG. 3 depicts a Graphic User Interface (GUI) 300 according to one implementation. The GUI 300 allows the user to enable and/or disable the point stick 206 and the touchpad 204. The GUI 300 also allows the user to enable and/or disable the corresponding point stick buttons 208 and the touchpad buttons 209. Further, the user may select a desired type of scroll setting, or cursor control setting for the point stick 206 to perform. The point stick 206 may be set as the scroll control device by default. For example, via the GUI, a user may enable the pointing stick as a scroll control device and enable the pointing stick as a cursor control device. A user may further choose to disable the function of the touchpad and/or pointing stick when an external (e.g., universal serial bus (USB)) mouse is couple to and detected by the IHS.

According to one aspect, the GUI may be automatically displayed by an operating system (OS) upon the first use of the point stick 206. In one implementation, a pop-up window with a dialog box, for example, may be displayed requesting the user to select functionality (e.g., cursor control function, scroll control function) of the point stick 206 for future usage. If the scroll control function is selected for the point stick 206, functionality of the corresponding point stick buttons 208 may be set according to user preference. According to another aspect, the GUI may be accessed via a touchpad settings user interface executed on the IHS (i.e., via the OS). Further, the algorithms for configuring touchpad methods/modes may be stored within a driver, typically residing on a storage medium (e.g., hard drive) of the IHS.

The previous description, as illustrated in the accompanied FIG. 3, is set forth for the purpose of explanation and not limitation, to provide one example of an interface to reconfigure an input device. It will be appreciated that any suitable interface, including windows, dialog boxes, buttons, or the like may be displayed, and all such variations are included within the scope of the present disclosure.

Figure 4:
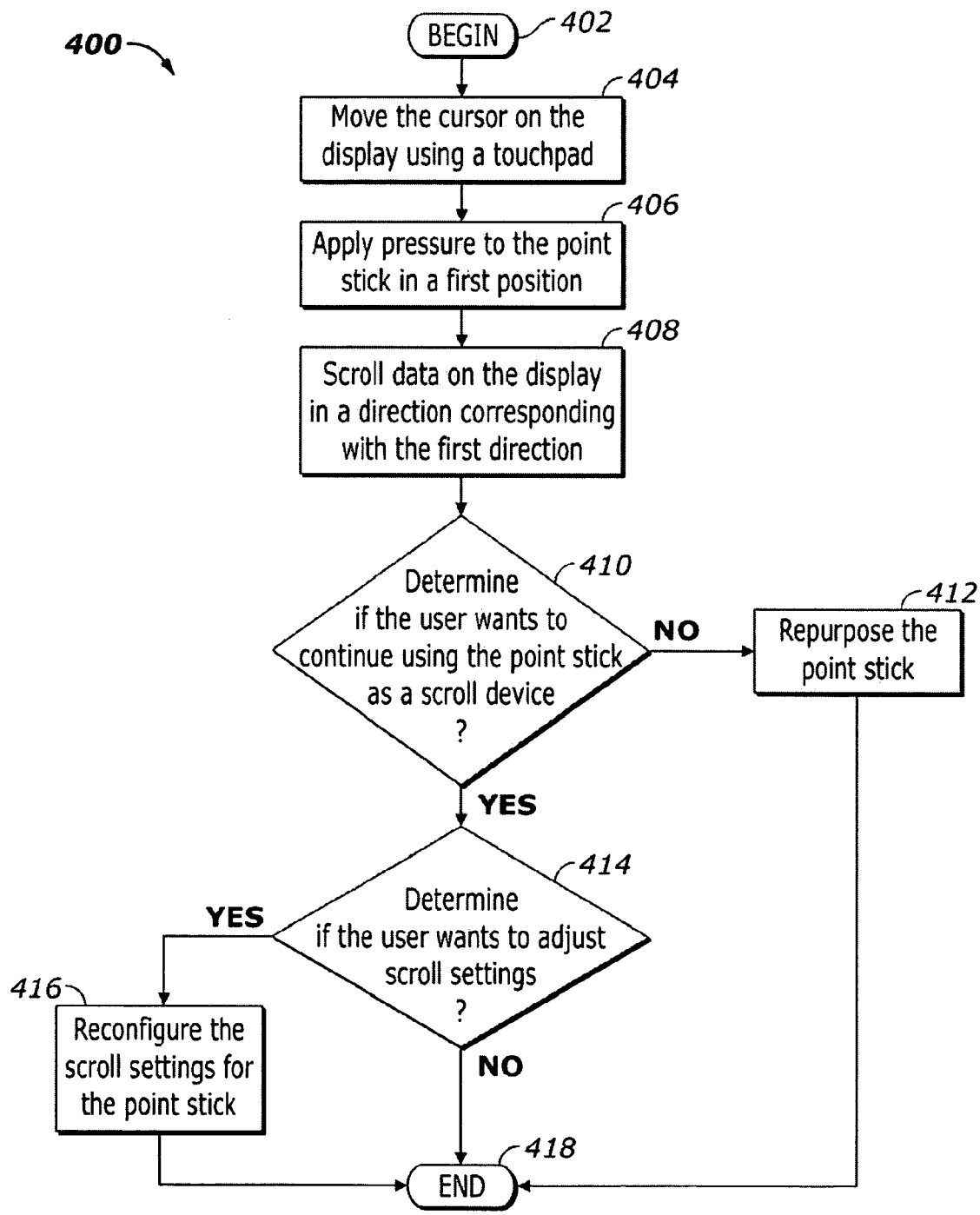
FIG. 4 is a flowchart illustrating the operation of a point stick in accordance with one aspect of the present disclosure.

FIG. 4 depicts a flowchart 400 according to one implementation disclosed herein. The flow 400 begins at block 402. The flow continues at block 404, wherein the cursor is moved on the display 55 using the touchpad 204. The user may place a finger on the touchpad 204 and move the finger on the touchpad 204 in a direction corresponding to the desired direction of movement of the cursor 210 on the display 55. With the cursor 210 at the desired location, the user may perform a function with the IHS 5, for example, such as launching a program by placing the cursor on an icon corresponding to the program and actuating one of the touchpad buttons 209 to launch the program. The user may then move the cursor within the open program in order to manipulate the program.

The flow 400 continues at block 406, wherein the user may apply pressure to the top, or distal end, of the point stick 206 in a first direction. The point stick 206 may be a small lever input device located near the center of the keyboard. Thus, the user applies pressure to the top end, or distal end, of the point stick 206. The terminal end, or keyboard end, of the point stick may be in communication with one or more pressure sensors. When the user applies pressure to the top end of the point stick 206, the pressure direction and force are detected by the sensors. A signal corresponding to the displacement of the mouse ball is generated in accordance with the pressure detected by the pressure sensors.

The flow continues at block 408, wherein data (e.g., page) is scrolled on the display 55 in a direction corresponding to the first direction. The point stick 206 may be set by default as a scroll control device. Thus, when the user applies pressure to the point stick 206 in a first direction, the data on the display 55 will move in a direction corresponding to the first direction. For example, if the user is working in a word processing program, moving the top of the point stick 206 toward the touch pad 204 may scroll down on the page, and/or pages, of the word processing program. Further, moving the point stick 206 in a direction toward the display 55 may scroll up on the page, and/or pages, of the word processing program. If the application being used is sized to be larger, or wider, than the display 55, the user may also scroll right or left on the application by applying pressure to the top of the point stick toward the left or right. The user may further use the point stick to scroll in a diagonal direction in the application. For example, if the user is working in a spreadsheet application, the user may wish to scroll diagonally to another location, such as a cell, in the spreadsheet. In this instance, the first direction may be the diagonal direction the user wishes to scroll. The user would then apply pressure to the point stick in the diagonal direction they wished to scroll. When done scrolling in the first direction the user may input data using the keypad 202, manipulate the cursor using the touchpad 204, and/or scroll in a second direction using the point stick 206.

The flow continues at block 410, where it is determined if the user wants to continue using the point stick 206 as a scroll control device. If the user chooses to discontinue using the point stick 206 as a scroll control device, the flow continues at block 412. At block 412, the point stick 206 may be repurposed. In one implementation, the point stick 206 may be repurposed as a cursor control device, and/or a zoom control device, as described herein. The point stick 206 may be repurposed using a Graphic User Interface (GUI) on the display 55, in one implementation. Further, the point stick 206 may be repurposed by actuating one of the point stick buttons 208. In this instance, the point stick button 208 may allow the user to toggle the point stick 206 between multiple purposes. For example, the user may toggle the point stick 206 between the scroll control device and the cursor control device by actuating one of the point stick buttons 208. Further, it should be appreciated that any button, key, or combination of buttons and/or keys, located on the IHS may be configured to repurpose, or toggle, the point stick 206 between multiple functions.

In one implementation, when the point stick 206 is repurposed from a scroll control device to a cursor control device the point stick buttons 208 may automatically reconfigure itself to support the function of the point stick 206. For example, the point stick buttons 208 may initially be configured to control scroll functions. When the point stick 206 is repurposed as a cursor control device, the point stick buttons 208 may be reconfigured as buttons similar to the touchpad buttons 209, or mouse buttons. Thus, the point stick buttons 208 may be automatically reconfigured to be a select button and a right click button upon toggling the point stick between control functions.

If the user desires to continue scrolling with the point stick 206, the flow continues at block 414. At block 414, it is determined if the user desires to adjust the scroll parameters of the point stick 206. If the user chooses to not adjust the scroll parameters associated with the point stick 206, the flow ends at block 418.

If the user chooses to adjust the scroll parameters, the flow continues at block 416. At block 416, the user may reconfigure the scroll parameters of the point stick 206. The user may reconfigure the scroll parameters of the point stick 206 between several settings. For example, the user may control a speed of the scrolling. In one example, the user may select between scrolling fast, scrolling slow or any speed setting between. In another example, the user may select a variable speed scroll function for the point stick 206. In the variable speed scroll, the speed of scrolling may increase, or decrease, as the pressure applied to the point stick 206 increases or decreases. The variable speed control device may further increase, or decrease, the scroll speed based on the amount of time the pressure is applied to the point stick 206.

The user may further control the scroll modes of the point stick 206. For example, the point stick 206 may be used as a vertical scroll control device in a first scroll mode. Thus, the user would only be able to the move the data on the display 55 up or down by manipulating the point stick 206. Further, the point stick may be used as a horizontal scroll control device in a second scroll mode, thereby allowing the user to only move the data on the display 55 to the right or left by manipulating the point stick 206. Further still, the point stick may be used as a multidirectional scroll control device. In this instance, the user may be able to scroll the data both in the vertical direction and the horizontal direction and any direction therebetween. It is further contemplated that point stick 206 may allow the user to scroll in diagonal directions.

The user may select the scroll parameters by changing the settings on the GUI 300 according to one implementation. Further, the user may use point stick buttons 208 to select scroll parameters, in an additional implementation. A first point stick button 208 may be configured to adjust the scroll speed, between any of the speed modes described herein. A second point stick button 208 may be configured to repurpose the point stick 206, as described herein. A third point stick button 208 may be configured to switch between scroll modes, and/or directions. The first point stick button 208 may be located on the left, the second point stick button 208 may be located in the middle and the third point stick button 208 may be located on the right, in one accordance with one aspect of the present disclosure. However, it should be appreciated that the first, second and third point stick buttons may be located in any order on the laptop or proximate the keypad, in one implementation. As shown, the point stick buttons 208 may be located between the touchpad 204 and the space bar of the keypad 202. Further, the scroll control device may be set as a zoom device.

In operation, a user may log onto, or turn on a laptop computer, or IHS 5. The display 55 of the laptop may display an operating system or any suitable application to the user. The user may then manipulate the location of the cursor 210 within any application on the display 55. The user manipulates the cursor 210 by placing a finger on the touchpad 204, typically located proximate the keypad 202. The user then moves his/her finger on the touchpad 204 in order to move the cursor 210 in a corresponding direction on the display 55. The user may move the cursor 210 on top of an icon of the operating system that represents a program, or application. The user may then actuate one of the touchpad buttons 209 which corresponds with the select button on a typical mouse. Actuating this 209 may launch the program or application on the display 55. The user may then open a file, or files, or start a new file in the program. If the open file has context data which is larger than what is able to be displayed on a single screen on the display 55, the user may wish view additional data not shown on the display 55. To view additional data, the user may scroll data contents shown on the display using the point stick 206. The user may place his/her finger on the top of the point stick 206. Then, if the user wants to scroll down on the display 55, the user may apply pressure to the top of the point stick 206 in a direction toward the touchpad 204. This application of pressure is sensed by one or more sensors (not shown). The data on the display 55 may then move in an upward on the display 55 thereby allowing the user to quickly move to data which is lower, or down on the program. The user may move the point stick 206 in any direction in order to quickly view data in the program. If the user desires to change the scroll speed for the point stick 206, the user may push the first point stick button 208. Pushing the first point stick button 208 may automatically switch the scroll speed between one or more predetermined scroll speeds, such as slow or fast, for example. If the user wishes to switch the scroll mode, the user may push the third point stick button 208. As another example, if the user desires to repurpose the point stick 206 to serve as a cursor control device, the user may push the second point stick button 208. Pushing the second point stick button 208 may switch the functionality of the point stick 206 between two or more functions, for example, a cursor control function, a scroll control function or a zoom control function. In the event the user switches the functionality of the point stick from a scroll control function to a cursor control function, the point stick buttons 208 may automatically be reconfigured to suitably support function of the point stick 206. The user may further repurpose the functionality of the point stick 206 and/or the touchpad 204 using a Graphic User Interface (GUI).

Generally, the present disclosure describes various methods of manipulating information on a display of an IHS, such as by movement of a cursor or by scrolling of data content on a display of an IHS. Particularly, the disclosed methods, systems and apparatus provide for reconfiguring the functionality of input devices, such as a point stick and/or touch pad, to manipulate a cursor or data content on a display of a portable IHS. Thus, the methods, systems and apparatus described herein may enhance the functionality of input devices of the portable IHS, resulting in improved customer satisfaction.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. An information handling system, the system comprising:
a processor;
a memory accessible by the processor;
a display;
a keypad with a plurality of keys;
a touchpad located proximate the keypad;
a point stick located substantially between at least two of the plurality of keys; and
instructions stored in the memory that, when executed, cause the processor to:
scroll a portion of the display in a first scroll mode in response to pressure applied to the point stick, wherein the first scroll mode comprises scrolling at a single speed;
detect an indication of a change of scroll modes; and
scroll the portion of the display in a second scroll mode in response to pressure applied to the point stick, wherein the second scroll mode comprises scrolling at an increasing speed as a function of the pressure applied to the point stick.

2. The system of claim 1 further comprising one or more point stick buttons located proximate the keypad, wherein the instructions, when executed, further cause the processor to configure a scroll parameter of the point stick in response to operation of one of the point stick buttons.

3. The system of claim 2, wherein the scroll parameter of the point stick is a scroll speed.

4. The system of claim 2, wherein the indication of a chance of scroll modes comprises the actuation of a point stick button.

5. The system of claim 2, wherein the instructions, when executed, further cause the processor to change function of the point stick from a scroll control device to a cursor control device.

6. A method for manipulating information on a display of an information handling system, the method comprising:
moving a cursor on the display in response to actuation of a touchpad proximate a keypad on the information handling system;
scrolling the information on the display in a first scroll mode in response to pressure applied to a point stick located substantially between at least two keys of the keypad, wherein the first scroll mode comprises scrolling at a single speed;
detecting an indication of a change of scroll modes; and
scrolling the information on the display in a second scroll mode in response to pressure applied to the point stick, wherein the second scroll mode comprises scrolling at an increasing speed as a function of the pressure applied to the point stick.

7. The method of claim 6 further comprising configuring the point stick to function as a cursor control device.

8. The method of claim 6 further comprising configuring the point stick to function as a zoom control device.

9. The method of claim 7, wherein configuring the point stick further comprises actuating a point stick button.

10. The method of claim 7, wherein configuring the point stick further comprises selecting a function of the point stick on via a graphic user interface (GUI).

11. The method of claim 7, wherein configuring the point stick further comprises automatically configuring one or more point stick buttons or one or more scroll control buttons.

12. The method of claim 6, further comprising configuring a scroll parameter of the point stick.

13. The method of claim 12, wherein the scroll parameter is a scroll speed.

14. The method of claim 6, wherein the indication of a chance of scroll modes comprises the actuation of a point stick button.

15. The method of claim 12, wherein configuring the scroll parameter comprises configuring the scroll parameter in response to actuation of a point stick button.

16. The method of claim 6, wherein scrolling the information comprises scrolling diagonally.

* * * * *